United States Patent [19]

Smith et al.

[11] Patent Number: 4,914,137

[45] Date of Patent: Apr. 3, 1990

[54] METHOD FOR STABILIZING POLYURETHANE FOAM USING AN ADDITIVE COMBINATION OF A PHENOTHIAZINE AND AT LEAST ONE CO-STABILIZER

[75] Inventors: Bernard C. Smith, Naugatuck, Conn.; Frank Powell, Rome, Italy; John F. Sierakowski, Middlebury, Conn.

[73] Assignee: Uniroyal Chemical Company, Inc., Middlebury, Conn.

[21] Appl. No.: 231,573

[22] Filed: Aug. 11, 1988

Related U.S. Application Data

[63] Continuation of Ser. No. 112,180, Oct. 21, 1987, abandoned, which is a continuation of Ser. No. 895,566, Aug. 11, 1986, abandoned, which is a continuation of Ser. No. 715,135, Mar. 22, 1985, abandoned.

[51] Int. Cl.$^4$ ............................................. C08G 18/14
[52] U.S. Cl. .................................... 521/107; 521/115; 521/117; 521/118; 521/121; 252/384; 524/700; 524/719
[58] Field of Search ............... 521/107, 115, 117, 118, 521/121, 128; 252/384; 524/710, 719

[56] References Cited

U.S. PATENT DOCUMENTS 4,010,211 3/1977 Preston et al. .................. 260/611.5
4,265,783 5/1981 Hinze ................................. 252/182

Primary Examiner—Maurice J. Welsh
Attorney, Agent, or Firm—John A. Shedden

[57] ABSTRACT

This invention relates to the stabilization of polyurethane foam by using a combination of a phenothiazine with at least a co-stabilizing effective amount of a compound selected from the group consisting of certain dithiocarbamates, thiuramsulfides, mercaptobenzothiazole, phosphites, phosphonites, phenolic antioxidants, pentaerythritol-tetrakis(beta-laurylthiopropionate), 4,4'-thiobis(2-t-butyl-5-methylphenol) and mixtures thereof.

15 Claims, No Drawings

METHOD FOR STABILIZING POLYURETHANE FOAM USING AN ADDITIVE COMBINATION OF A PHENOTHIAZINE AND AT LEAST ONE CO-STABILIZER

This is a continuation of application Ser. No. 112,180 filed Oct. 21, 1987 now abandoned, which is a continuation of application Ser. No. 895,566 filed Aug. 11, 1986 (abandoned), which is a continuation of application Ser. No. 715,135 filed Mar. 22, 1985 (abandoned).

BACKGROUND OF THE INVENTION

1. Field of the Invention

This invention relates to stabilized polyurethane foam. More specifically, the present invention is concerned with stabilizing polyurethane foam by using a combination of a phenothiazine with a co-stabilizer selected from the group consisting of certain dithiocarbamates, thiuramsulfides, mercaptobenzothiazole, phosphites, phosphonites, phenolic antioxidants, pentaerythritoltetrakis(beta-laurylthiopropionate), 4,4'-thiobis(2-t-butyl-5-methylphenol) and mixtures thereof.

2. Description of the Prior Art

Polyurethane foams have been prepared from polyols stabilized against oxidative degradation with combinations of sterically hindered phenols, diphenyl amines and a phenothiazine, for example, as taught in U.S. Pat. Nos. 4,265,783; 4,275,173; 4,010,211; and 4,363,745.

The use of carbamates in connection with polyurethanes is also known. U.S. Pat. No. 3,006,870 (Steinfatt et al) discloses a polyurethane containing 0.2–5.0 zinc di-lower alkyl dithiocarbamate for the protection against fungi and bacteria.

U.S. Pat. No. 3,182,037 (Nelson) discloses the use of 0.5–10 parts of dithiocarbamate and 5.0 parts or more of TiO$_2$ in 100 parts polyurethane for the stabilization against ultraviolet degradation.

U.S. Pat. No. 3,255,129 (Ferrari) discloses the use of 0.0–10 parts of certain zinc dithiocarbamates used alone for the stabilization of polurethane elastomers.

U.S. Pat. No. 3,432,474 (Lombardi) discloses the use of metal dithiocarbamates as catalysts for curing a mixture of polyurethane prepolymer and a curative therefore, such as a polyol. 0.2–5 percent of catalyst is used based on the total ingredients employed. No stabilization is mentioned in this reference.

U.S. Pat. No. 3,978,011 discloses the stabilization of flame-retardant polyurethane foam using zinc dithiocarbamate or zinc monocarboxylate in the presence of zinc oxide, antimony oxide or chlorinated polymer. Zinc salt is present at 0.01–0.9 parts computed as metallic zinc per 100 parts of polyol used.

U.S. Pat. No. 4,356,274 (Sandler) discloses a rigid polyurethane foam containing 0.1–20 parts mercaptobenzothiazole, dithiocarbamates and the like.

Furthermore, the use of certain hindered phenols and amine antioxidants in polyols is disclosed in other references such as, U.S. Pat. Nos. 3,567,664; 3,637,865; 4,007,230; 4,021,385; 4,070,304; and 4,228,247.

There is a constant search in the art to find ways to decrease the quantity of antioxidant necessary to effectively stabilize the polyol and polyurethane against oxidative degradation and the foams prepared therefrom from scorching.

It has now been discovered that combinations of a phenothiazine with certain co-stabilizers, combinations not heretofore discovered by the art, realize polyols and polyurethanes with greatly improved stability against oxidative degradation at the same level of prior art antioxidants or for the same amount of prior art stability utilizing reduced levels of antioxidant.

SUMMARY OF THE INVENTION

The present invention is directed toward the enhanced oxidative stabilization of polyols and polyurethane foams by the incorporation of a phenothiazine and certain co-stabilizers as detailed below; the preferred co-stabilizer being a dithiocarbamate wherein the weight ratio of phenothiazine to co-stabilizer may be from about 5:1 to 1:5 and the concentration of the combination may be from about 200 to 2000 ppm in the polyol based on the polyol weight and from about 60 to 1500 ppm in the polyurethane based on the polyurethane weight.

DETAILED DESCRIPTION OF THE INVENTION

The instant invention relates to improved stabilizing compositions for polyols and polyurethanes comprising a phenothiazine having the formula I:

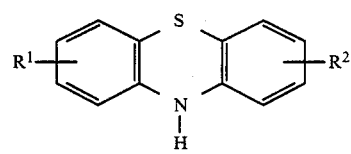

wherein
R$^1$ and R$^2$ are the same or different and are hydrogen or C$_1$–C$_{12}$ alkyl; and
a co-stabilizer selected from the group consisting of:
(A) a dithiocarbamate having the formula II:

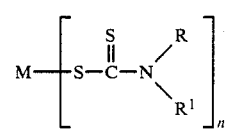

wherein
M is a metal;
n is 1 to 4; and
R and R$^1$ are the same or different and are C$_1$–C$_{18}$ alkyl, C$_5$–C$_6$ cycloalkyl, benzyl, phenyl or tolyl, or
R and R$^1$ together form a C$_4$–C$_5$ alkylene, C$_4$–C$_6$ oxydialkylene or C$_4$–C$_6$ thiodialkylene;
(B) a phenolic compound having the formula III:

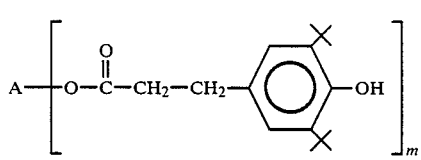

wherein
m is 1, 2 or 4 (depending on the valence of A);
A is C(CH$_2$)$_4$, —CH$_2$CH$_2$SCH$_2$CH$_2$—, C$_{18}$H$_{37}$— or —CH$_2$CH$_2$NHCOCONHCH$_2$CH$_2$—;
(C) a diarylamine having the formula IV:

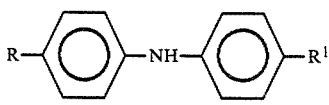   IV wherein

R and R¹ are the same or different and are $C_1$–$C_{18}$ alkyl, benzyl, phenethyl or cumyl provided that at least one of the R radicals contains a phenyl moiety;

(D) thiuram monosulfides;
(E) thiuram polysulfides;
(F) pentaerythritoltetrakis(beta-lauryl-thiopropionate);
(G) dilaurylthio dipropionate;
(H) distearylthio dipropionate;
(I) tetrakis(2,4-di-t-butylphenyl)-4,4'-biphenylenediphosphonite;
(J) bis(2,4-di-t-butylphenyl) pentaerythritol diphosphite;
(K) mercaptobenzothiazole;
(L) 4,4'-thiobis[2-(1,1-dimethylethyl)-5-methylphenol];
(M) an alkylated triphenyl phosphite; and
(N) mixtures thereof.

Preferably, the stabilizing compositions of the instant invention comprise a phenothiazine having the formula I:

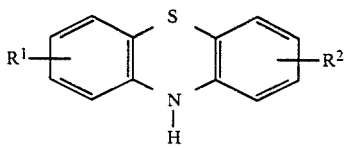   I wherein

R¹ and R² are the same or different and are hydrogen or $C_1$–$C_{12}$ alkyl; and a co-stabilizer selected from the group consisting of:

(A) a dithiocarbamate having the formula II:

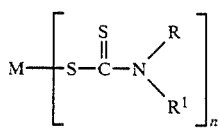   II wherein
M is a metal;
n is 1 to 4; and
R and R¹ are the same or different and are $C_1$–$C_{18}$ alkyl, $C_5$–$C_6$ cycloalkyl, benzyl, phenyl or tolyl, or
R and R¹ together form a $C_4$–$C_5$ alkylene, $C_4$–$C_6$ oxydialkylene or $C_4$–$C_6$ thiodialkylene;

(B) a phenolic compound having the formula III:

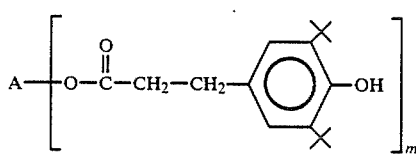   III wherein m is 1, 2 or 4 (depending on the valence of A);
A is $C(CH_2)_4$, $-CH_2CH_2SCH_2CH_2-$, $C_{18}H_{37}-$ or $-CH_2CH_2NHCOCONHCH_2CH_2-$;
(C) thiuramdisulfides;
(D) mercaptobenzothiazole;
(E) pentaerythritoltetrakis(beta-laurylthiopropionate); and
(F) 4,4'-thiobis[2-(1,1-dimethylethyl)-5-methyl phenol].

Most preferably, said co-stabilizers are selected from the group consisting of:

(A) a dithiocarbamate having the formula:

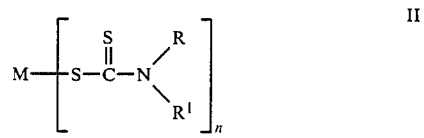   II wherein
M is a metal;
n is 1 to 4; and
R and R¹ are the same or different and are $C_1$–$C_{18}$ alkyl, $C_5$–$C_6$ cycloalkyl, benzyl, phenyl or tolyl, or
R and R¹ together form a $C_4$–$C_5$ alkylene, $C_4$–$C_6$ oxydialkylene or $C_4$–$C_6$ thiodialkylene;

(B) a phenolic compound having the formula III:

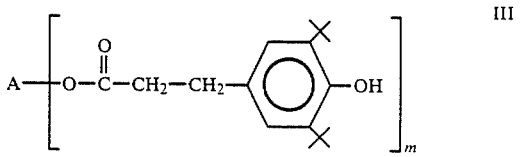   III wherein m is 1, 2 or 4 (depending on the valence of A);
A is $C(CH_2)_4$, $C_{18}-H_{37}-$ or $-CH_2CH_2NHCOCONHCH_2CH_2-$; and
(C) mercaptobenzothiazole.

In the preferred phenothiazine of formula I, R¹ and R² are hydrogen.

The preferred dithiocarbamates are those of the formula wherein M is Na, K, Mg, Ca, Ba, Mn, Fe, Co, Cr, Ni, Cu, Zn, Cd, Sn or Sb. Most preferably, M is Na, K, Ca, Ba, Mg, Mn, Cu, Co, Zn. In the dithiocarbamates given above, R and R¹ are preferably $C_1$–$C_{12}$ alkyl and benzyl.

The preferred diarylamines are those of the formula given above wherein R is phenethyl or cumyl.

The weight ratio of phenothiazine to co-stabilizer may be from 5/1 to 1/5, preferably 4/1 to 1/4 and most preferably 3.5/1 to 1/3.3.

The concentration of the phenothiazine and co-stabilizer(s) in the polyol may be from 200-2000 ppm, preferably 300-1400 ppm, most preferably 400-800 ppm based on the polyol weight.

The concentration of the phenothiazine plus co-stabilizer(s) in the polyurethane may vary from 60 to 1500 ppm, preferably from 150 to 850 ppm, usually from 200 to 550 ppm based on the polyurethane weight.

Polyols used in making foamed polyurethanes are general primary and secondary hydroxy-terminated polyoxyalkylene ethers having from 2 to 4 hydroxyl groups and a molecular weight of from about 1,000 to 10,000. They are liquids or are capable of being liquified or melted for handling in the polyurethane foam process.

Examples of polyoxyalkylene polyols include linear and branched polyethers having a plurality of ether linkages and containing as least two hydroxyl groups and being substantially free from functional groups other than hydroxyl groups, e.g. polypropylene glycols, the polypropylene-ethylene glycols, the polybutylene ether glycols, polymers and copolymers of ethylene oxide and propylene oxide and the like. Among the polymers and copolymers are the ethylene oxide, propylene oxide and butylene oxide adducts of ethylene glycol, propylene glycol, diethylene glycol, dipropylene glycol, triethylene glycol, 2-ethylhexanediol-1,3-glycerol, 1,2,6-hexanetriol, trimethylolpropane, trimethylolethane, and pentaerythritol. Linear and branched copolyethers of alkylene oxides are also useful in making foamed products as well as the polypropylene diols, triols and tetrols end-blocked with ethylene oxide to provide primary hydroxyl groups in the polymer and having molecular weights of from about 2000 to 9000.

Polyisocyanates used for making (foamed) polyurethane in accordance with the invention include the following: any organic di- or tri-isocyanate can be used. Diisocyanates are preferred, particularly when there is any considerable amount of branching in the polyol or crosslinking to avoid the formation of rigid or semi-rigid foams. Examples of suitable organic polyisocyanates are ethylene diisocyanate, trimethylene diisocyanate, tetramethylene diisocyanate, pentamethylene diisocyanate, hexamethylene diisocyanate, propylene-1,2-diisocyanate, butylene-1,2-diisocyanate, butylene-1,2-diioscyanate, butylene-1,3-diisocyanate, butylene-2,3-diisocyanate, alkylidene diisocyanates such as ethylidine diisocyanate and butylidine diisocyanate; cycloalkylene diisocyanates such as cyclopentylene-1,3-diisocyanate, cyclohexylene-1,2-diisocyanate, cyclohexylene-1,3-diisocyanate, and cyclohexylene-1,4-diisocyanates such as xylylene-1,4-diisocyanate, xylylene-1,3-diisocyanate, bis(4-isocyanatophenyl) methane, bis(3-methyl-4-isocyanatophenyl) methane, and 4,4'-diphenylpropane diisocyanate, durene diisocyanate, 4,4',4''-tris(isocyanatophenyl)methane, 3,10-diisocyanatotricyclo[5.2],0$^{2.6}$] decane, bis-(2-isocyanatoethyl)carbonate, and naphthalene trisocyanate and the like. Mixtures of polyisocyanates can be used. Preferably, tolylene diisocyanates are employed.

For causing foaming of polyurethane, foaming agents such as water or blowing agents, such as fluorocarbon materials as is well known in the art may be used.

Other ingredients employed for making foamed polyurethanes are catalysts, surfactants, extender oils, fungicides, bacteriostats, deodorants and the like.

In the following examples all parts are by weight unless otherwise indicated. These examples are illustrative of the invention without limiting the scope of the invention.

EXAMPLE I

Mixtures of polyol (glycerine-based ethylenepropylene ether triol, M.W. 3000) dithiocarbamate and phenothiazine were prepared at levels indicated in Table I. Subsequently, based on 100 parts of polyol, the following ingredients were added (all in parts by weight): water (4.5), amine/glycol catalyst (0.1), polyalkylene oxymethylsiloxane surfactant (1.0) and stannous octoate (50%) catalyst in diethyl phthalate (0.35). Total weight of this mixture was about 106 g. While stirring, tolylene diisocyanate (63.0) was added, and the reaction mixture was poured into a cardboard box (20 cm×20 cm×10 cm). The foam was allowed to rise to its maximum height and was then placed into an air circulating oven set for 170° C. (every hour the position of the foam was changed in order to avoid irregular heating due to possible hot spots from the oven); taken out of the form; and a centerpiece of about ⅓ of the total foam was immediately cut out of the total foam sample for evaluation. The foam density was about 0.8 g/cm$^3$.

The following scale of color quality determination was adopted:

| Grade | Definition |
|---|---|
| 1 | No discoloration; white |
| 2 | Very slight yellowing |
| 3 | Slight yellowing |
| 4 | Light yellowing |
| 5 | Clearly perceptible yellowing |
| 6 | Very slightly brown |
| 7 | Very light brown |
| 8 | Light brown |
| 9 | Definitely brownish tint |
| 10 | Brownish |

A color rating of 5 or higher under these conditions is considered unsatisfactory. Preferably the rating should be 3 or less.

TABLE I

| Run No. (ppm) | 1 | 2 | 3 | 4 | 5 | 6 | 7 | 8 |
|---|---|---|---|---|---|---|---|---|
| BUC$^{(1)}$ | 1350 | — | 675 | 500 | 150 | 325 | 250 | 1038 |
| PTZ$^{(2)}$ | — | 1350 | 675 | 150 | 500 | 325 | 75 | 312 |
| TOTAL: | 1350 | 1350 | 1315 | 650 | 650 | 650 | 325 | 1350 |
| RATING: | 7 | 6–7 | 2–3 | 1–2 | 1–2 | 1–2 | 4 | 2–3 |

REMARKS:
$^{(1)}$BUC: zinc dibutyldithiocarbamate
$^{(2)}$PTZ: phenothiazine

Run Nos. 3–8 clearly demonstrate the unexpected synergistic effect of the combination of dithiocarbamate and phenothiazine stabilizer over the dithiocarbamate or phenothiazine stabilizers alone. Such synergism is apparent at various concentrations and ratios.

EXAMPLE 2

Following essentially the procedures of Example 1, phenothiazine was evaluated in combination with other co-stabilizers. The recipes and results are summarized in Table II.

TABLE II

| | 9 | 10 | 11 | 12 | 13 | 14 | 15 | 16 | 17 |
|---|---|---|---|---|---|---|---|---|---|
| PTZ, ppm | 150 | 150 | 150 | 150 | 150 | 150 | 150 | 150 | 150 |
| Co-stabilizer No. | 1 | 2 | 3 | 4 | 5 | 6 | 7 | 8 | 9 |
| Co-stabilizer, ppm | 500 | 500 | 500 | 500 | 500 | 500 | 500 | 500 | 500 |
| Total ppm** | 650 | 650 | 650 | 650 | 650 | 650 | 650 | 650 | 650 |
| Foam Color | 1–2 | 1–2 | 1–2 | 1–2 | 2 | 2 | 2 | 2 | 3 |

TABLE II-continued

|  | 18 | 19 | 20 | 21 | 22 | 23 | 24* | 25*** | 26*** |
|---|---|---|---|---|---|---|---|---|---|
| PTZ, ppm | 150 | 150 | 150 | 150 | 150 | 150 | 1350 | 150 | 67 |
| Co-stabilizer No. | 10 | 11 | 12 | 13 | 14 | 15 | — | 16 | 16 |
| Co-stabilizer, ppm | 500 | 500 | 500 | 500 | 500 | 500 | — | 1500 | 675 |
| Total ppm** | 650 | 650 | 650 | 650 | 650 | 650 | 1350 | 1650 | 1350 |
| Foam Color | 2-3 | 2-3 | 2-3 | 2-3 | 2-3 | 2-3 | 6-7 | 4-5 | 8 |

REMARKS:
*See Run No. 2
**Concentration in polyol; actual concentration in foam ca. 64% of concentration in polyol.
***Outside invention.

Combinations of phenothiazine with more than one co-stabilizer may be employed.

EXAMPLE 3

Various dithiocarbamates were employed in combination with phenothiazine and BHT (stabilizer No. 16) using essentially the procedure of Example 1. The results are disclosed in Table III.

TABLE III

| Run No. | 27 | 28 | 29 | 30 | 31 |
|---|---|---|---|---|---|
| PTZ, ppm | 150 | 150 | 150 | 150 | 150 |
| BHT, ppm | 700 | 700 | 700 | 700 | 700 |
| MEC$^{(1)}$, ppm | 500 | — | — | — | — |
| ETC$^{(2)}$, ppm | — | 500 | — | — | — |
| BUC$^{(3)}$, ppm | — | — | 500 | — | — |
| BEC$^{(4)}$, ppm | — | — | — | 500 | — |
| OIC$^{(5)}$, ppm | — | — | — | — | 500 |
| TOTAL ppm | 1350 | 1350 | 1350 | 1350 | 1350 |
| FOAM COLOR | 1-2 | 1-2 | 1 | 1-2 | 2 |

REMARKS:
$^{(1)}$zinc bis(dimethyldithiocarbamate)
$^{(2)}$zinc bis(diethyldithiocarbamate)
$^{(3)}$zinc bis(dibutyldithiocarbamate)
$^{(4)}$zinc bis(dibenzyldithiocarbamate)
$^{(5)}$zinc bis (N-isopropyl-N-octadecyl-dithiocarbamate)

The above data shows the excellent color stability realized in polyurethane foam when using a phenothiazine and a dithiocarbamate composition of this invention in combination with another stabilizer.

EXAMPLE 4

Following the procedure of Example 1, triple combinations of ingredients were evaluated in polyurethane foam. The recipes and results are described in Table IV.

TABLE IV

| Run No. | 32 | 33 | 34 |
|---|---|---|---|
| PTZ | 150 | 150 | 75 |
| Co-stabilizer | BUC | BUC | BUC |
| Co-stabilizer, BUC, ppm | 250 | 500 | 250 |
| Co-stabilizer No. | 1 | 1 | 1 |
| Co-stabilizer, #1, ppm | 375 | 500 | 375 |
| TOTAL ppm | 775 | 1150 | 700 |
| Foam rating | 2 | 2 | 1-2 |

The above data shows the excellent color stability realized in polyurethane foam when a phenothiazine of this invention is combined with two co-stabilizers of this invention.

It has also been found that the stabilizing compositions of this invention exhibit results superior to known methods of protecting polyurethane foams containing flame retardants. Color ratings substantially coincide with the trend observed in the above experiments.

The foregoing detailed description is to be clearly understood as given by way of illustration and example only, the spirit and scope of this invention being limited solely by the appended claims.

We claim:

1. A stabilized polyurethane foam composition comprising a polyurethane foam containing an effective amount of a stabilizing mixture comprising:
 a phenothiazine of formula (I)

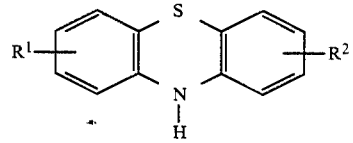

wherein
R$^1$ and R$^2$ are the same or different and are hydrogen or C$_1$-C$_{12}$ alkyl; and
a co-stabilizer selected from the group consisting of:
(A) a dithiocarbamate having the formula II:

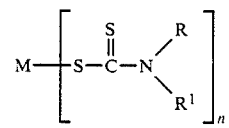

wherein
M is a metal;
n is 1 to 4; and
R and R$^1$ are the same or different and are C$_1$-C$_{18}$ alkyl, C$_5$-C$_6$ cycloalkyl, benzyl, phenyl or tolyl, or
R and R$^1$ together form a C$_4$-C$_5$ alkylene, C$_4$-C$_6$ oxydialkylene or C$_4$-C$_6$ thiodialkylene;
(B) mercaptobenzothiazole; and
(C) mixtures thereof.

2. The stabilized polyurethane foam composition of claim 1 wherein R$^1$ and R$^2$ of the phenothiazine formula I are both hydrogen.

3. The stabilized polyurethane foam composition of claim 1 wherein in the dithiocarbamate of formula II, M is Na, K, Ca, Ba, Mg, Mn, Cu, Co or Zn and R and R$^1$ are C$_1$-C$_{12}$ alkyl or benzyl.

4. The stabilized polyurethane foam composition of claim 1 wherein said co-stabilizer is
(A) a dithiocarbamate having the formula:

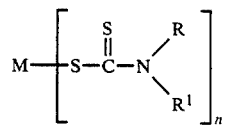

wherein
M is a metal;

n is 1 to 4; and

R and $R^1$ are the same or different and are $C_1$–$C_{18}$ alkyl, $C_5$–$C_6$ cycloalkyl, benzyl, phenyl or tolyl, or R and $R^1$ together form a $C_4$–$C_5$ alkylene, $C_4$–$C_6$ oxydialkylene or $C_4$–$C_6$ thiodialkylene.

5. The stabilized polyurethane foam composition of claim 1 wherein said stabilizing mixture is present from about 60 to about 1500 ppm based on the polyurethane weight.

6. The stabilized polyurethane foam composition of claim 1 wherein the weight ratio of the phenothiazine of formula I to co-stabilizer(s) is from about 5:1 to about 1:5.

7. A stabilized polyol composition comprising a polyol containing an effective amount of a stabilizing mixture comprising a phenothiazine of formula (I)

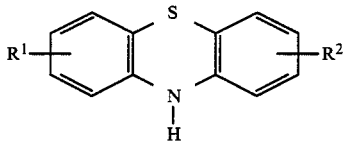

wherein $R^1$ and $R^2$ are the same or different and are hydrogen or $C_1$–$C_{12}$ alkyl; and a co-stabilizer selected from the group consisting of:

(A) a dithiocarbamate having the formula II:

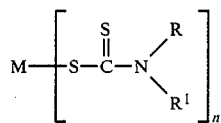

wherein

M is a metal;

n is 1 to 4; and

R and $R^1$ are the same or different and are $C_1$–$C_{18}$ alkyl, $C_5$–$C_6$ cycloalkyl, benzyl, phenyl or tolyl, or R and $R^1$ together form a $C_4$–$C_5$ alkylene, $C_4$–$C_6$ oxydialkylene or $C_4$–$C_6$ thiodialkylene;

(B) mercaptobenzothiazole;

(C) mixtures thereof.

8. The stabilized polyol composition of claim 7 wherein $R^1$ and $R^2$ of the phenothiazine formula I are both hydrogen.

9. The stabilized polyol composition of claim 7 wherein in the dithiocarbamate of formula II, M is Na, K, Ca, Ba, Mg, Mn, Cu, Co or Zn and R and $R^1$ are $C_1$–$C_{12}$ alkyl or benzyl.

10. The stabilized polyol composition of claim 7 wherein said co-stabilizer is (A) a dithiocarbamate having the formula:

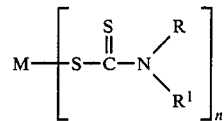

wherein

M is a metal;

n is 1 to 4; and

R and $R^1$ are the same or different and are $C_1$–$C_{18}$ alkyl, $C_5$–$C_6$ cycloalkyl, benzyl, phenyl or tolyl, or R and $R^1$ together form a $C_4$–$C_5$ alkylene, $C_4$–$C_6$ oxydialkylene or $C_4$–$C_6$ thiodialkylene.

11. The stabilized polyol composition of claim 7 wherein said stabilizing mixture is present from about 200 to about 2000 ppm based on the polyol weight.

12. The stabilized polyol composition of claim 7 wherein the weight ratio of the phenothiazine of formula I to co-stabilizer(s) is from about 5:1 to about 1:5.

13. A stabilizing mixture for polyurethane foams comprising:

a phenothiazine of formula I

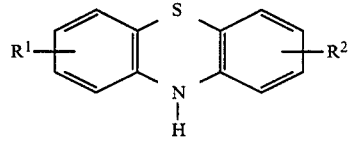

wherein $R^1$ and $R^2$ are the same or different and are hydrogen or $C_1$–$C_{12}$ alkyl; and a co-stabilizer selected from the group consisting of:

(A) a dithiocarbamate having the formula II:

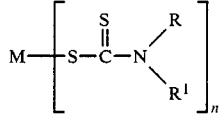

wherein

M is a metal;

n is 1 to 4; and

R and $R^1$ are the same or different and are $C_1$–$C_{18}$ alkyl, $C_5$–$C_6$ cycloalkyl, benzyl, phenyl or tolyl, or R and $R^1$ together form a $C_4$–$C_5$ alkylene, $C_4$–$C_6$ oxydialkylene or $C_4$–$C_6$ thiodialkylene;

(B) mercaptobenzothiazole;

(C) mixtures thereof.

14. The mixture of claim 13 wherein $R^1$ and $R^2$ of the phenothiazine of formula I are both hydrogen.

15. A method for making a stabilized polyurethane foam comprising reacting the stabilized polyol composition of claim 13 with a polyisocyanate and a foaming agent.

* * * * *